United States Patent [19]

Swansen

[11] Patent Number: 4,613,763
[45] Date of Patent: Sep. 23, 1986

[54] WIND DRIVEN ELECTRIC POWER GENERATING SYSTEM

[76] Inventor: Theodore L. Swansen, 4424 Pleasant Lake Rd., East Troy, Wis. 53120

[21] Appl. No.: 686,092

[22] Filed: Dec. 24, 1984

[51] Int. Cl.$^4$ ............................ F03D 9/00; H02P 9/04
[52] U.S. Cl. ........................................ 290/44; 290/55; 322/35
[58] Field of Search ..................... 290/43, 44, 54, 55; 322/35, 38, 39, 40, 41, 10, 11, 16

[56] References Cited

U.S. PATENT DOCUMENTS 4,461,957  7/1984  Jallen .................................. 290/44
4,464,579  8/1984  Schwarz .............................. 290/44

Primary Examiner—L. T. Hix
Assistant Examiner—Brian W. Brown
Attorney, Agent, or Firm—Fuller, House & Hohenfeldt

[57] ABSTRACT

The shaft of a wind driven propeller is coupled to the rotor shaft of an electrical generator through an over-running centrifugal clutch and a speed changer mechanism. When the wind attains a certain velocity, a propeller shaft speed responsive device closes a switch that connects the output terminals of the generator to an energized electric distribution system so the generator runs as a motor long enough to accelerate up to rated speed and concurrently get the speed changer mechanism up to speed. The clutch engages the propeller shaft to the speed changers at this time and the generator begins to supply supplemental power to the system. Because all rotating parts are brought up to matching speeds together, the inertia shock that would result from connecting the propeller to a speed changer and generator that are at a standstill is avoided. When wind velocity drops, the generator runs as a motor for a moment and causes the over-running clutch to disengage.

5 Claims, 3 Drawing Figures

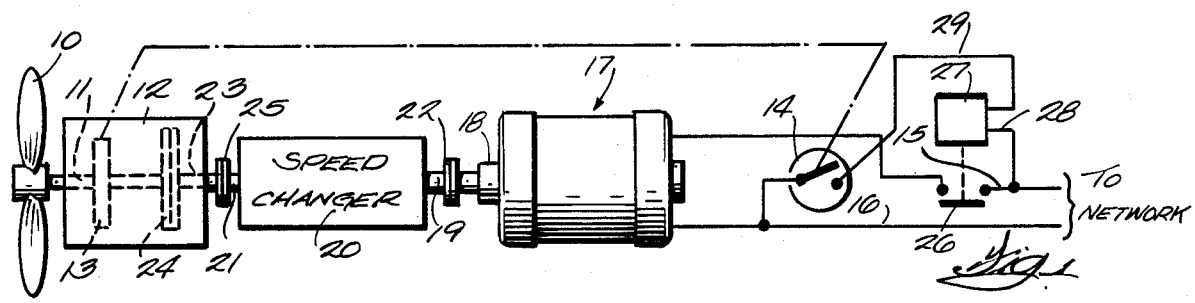
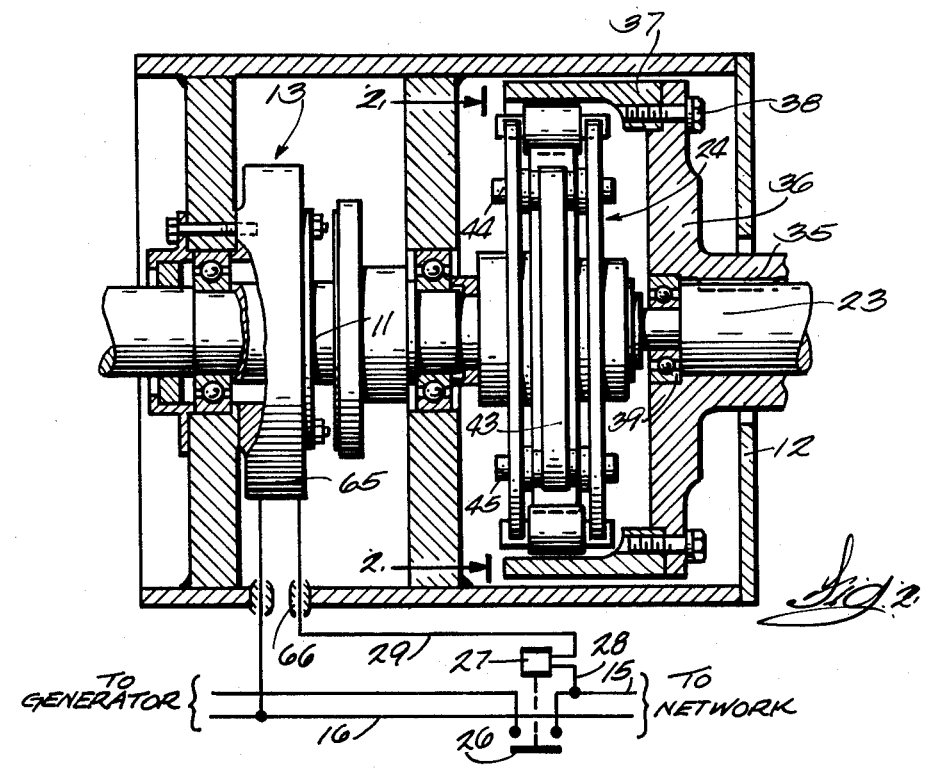
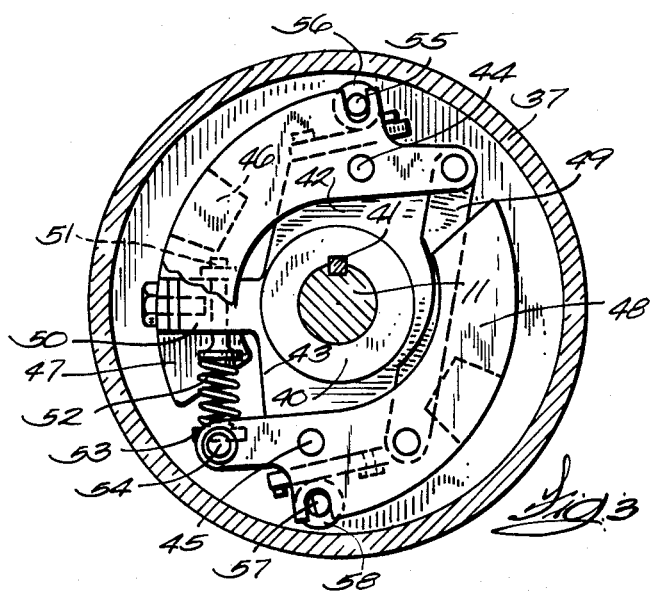

WIND DRIVEN ELECTRIC POWER GENERATING SYSTEM

BACKGROUND OF THE INVENTION

This invention pertains to a wind driven electric power generating system intended primarily for supplying electric power, when wind conditions allow, to a network to which other power generating equipment is coupled.

Conventional wind powered generators comprise a propeller that turns a shaft which is directly coupled to the input shaft of a speed changing mechanism whose output shaft is coupled to the shaft of a rotor in an electric generator. It is believed that in the prior art an anemometer operated switch is employed to complete a circuit to a power network to cause the generator to operate as a motor and get the gear box up to synchronous speed. However, use of a remote anemometer does not provide an accurate sensing of the wind conditions on the wind generator propeller. There is a switch in a circuit between the output terminals of the generator and the network or general electric power system which switch is operative to disconnect the generator from the power lines when wind velocity is low so the generator does not run as a motor and draw power wastefully from the system. In prior art systems, when the propeller is turning at a speed which would result in the generator going up to synchronous speed but the generator is at a standstill at this time so a severe shock is created in the generating system. This is because the rotor of the generator has a high inertia which, in a sense, is amplified by the speed changer that is interposed between the rotor shaft and the relatively slower turning propeller shaft. There is not only a mechanical shock to the system, but it also takes time for the generator rotor to accelerate up to the power system or network synchronous speed which means, that during acceleration time, the output voltage from the generator will be out of phase with the system to which it connects. This can cause undesirable transient current to flow.

SUMMARY OF THE INVENTION

The invention disclosed herein eliminates the mechanical shock that is imposed when the propeller shaft is suddenly coupled to the generator. In addition, novel means are provided for disengaging the generator from the propeller shaft automatically when wind speed drops below that at which the generator will develop voltage that matches the frequency of the electric power system or network to which the generator is connected.

In accordance with the invention, a centrifugal switch is operated from the propeller shaft and hence senses the same wind conditions that are affecting the propeller and overcomes the disadvantages of a remote anemometer. Moreover, an anemometer is sensitive and reacts to widely fluctuating wind conditions before the propeller, with its inertia, can react. Hence, the generator and gear box may be energized on wind gusts, and changes in wind direction which will not produce usable energy. A centrifugal clutch is used to couple the propeller shaft to to low speed input shaft of a speed changer whose output shaft couples to the generator's rotor. The switch contacts of the centrifugal switch are in series with the lines that connect the output terminals of the generator with the power system that is being energized by generators driven with fuel powered prime movers, for instance. When the propeller shaft attains a predetermined percentage of synchronous speed, the centrifugally operated switch connects the generator to the power system so the generator runs as a motor. The motor accelerates as does the speed changer gear train so its input shaft is brought up to a speed corresponding with synchronous speed for the generator. Thus, shortly after the centrifugal switch closes, and as the speed increases the centrifugal clutch responds to the increased speed by coupling the input shaft of the speed changer to the propeller shaft which shafts are then operating at substantially the same speed so that the generator which will now be operating in the power generation mode will be in phase with the system to which it is connected.

A more detailed description of how the foregoing features and other features of the invention are achieved will now be explained in greater detail in reference to the drawings.

DESCRIPTION OF THE DRAWINGS

FIG. 1 is a block diagram of a wind powered electrical generating system in which the invention is incorporated;

FIG. 2 is a vertical section through a box containing a centrifugal switch and a centrifugal clutch which are used in the wind powered generator system; and FIG. 3 is a vertical section taken on the line 2—2 in FIG. 2 showing the centrifugal mechanism of the clutch.

DESCRIPTION OF A PREFERRED EMBODIMENT

Referring to FIG. 1, the system comprises a propeller 10 that is driven at a rotational speed proportional to the velocity of the wind. The propeller is fastened to a propeller shaft 11 which extends into a bearing box 12. A centrifugal switch operator, generally designated by the numeral 13 is located in box 12. Its switch contacts are actually associated with the centrifugal force actuated mechanism of the operator but the contacts are separated from the mechanism in FIG. 1 and depicted as item 14 in a circuit including lines 15 and 16. These lines connect to an electric power system network that is to be supplemented with power from a wind driven generator which is generally designated by the number 17. The generator may be any type that will generate ac electric power when its rotor is driven mechanically and will run as a motor to drive a load when it is supplied with electric power from an independent source such as from a power network. For convenience and the sake of brevity, item 17 will be referred to herein as a generator but it will be understood that sometimes it will operate in an electric power generating mode and for short periods at other times as an electric power consumer while operating in a motor mode.

A shaft 18 extends from the rotor, not shown, of generator 17. This shaft couples to the output shaft 19 of a speed changer that is symbolized by the block marked 20. In an actual embodiment, the speed changer is a conventional gear reduction system which has the output shaft 19 and a power input shaft 21. For the purposes of the invention, the ratio of the speed changer is such that the second or output shaft 19 of the speed changer will turn through several revolutions for every one revolution of the first or input shaft 21 of the speed changer. Conversely, first shaft 21 will turn only one revolution for several revolutions of the second shaft 19 when the second shaft drives the speed changer reversely as is the case when the generator is in the motor mode. The second shaft of the speed changer is coupled to the generator rotor shaft 18 by means of a conventional coupling 22. The first shaft 21 of the speed changer is coupled to a shaft 23 that is driven through a centrifugal clutch 24. The shaft 23 is coupled to the first shaft 21 of the speed changer by means of a coupling 25.

In the circuit including lines 15 and 16 leading to the independently energized power system or network, not shown, there is a switch contact 26 which is operated by a relay coil, for example, 27. The relay coil is connected by way of leads 28 and 29 across power lines 15 and 16. If there is an outage in the network, relay coil 27 deenergizes and allows contact 26 to drop out to thereby prohibit the wind driven generator 17 from feeding power into the power network by itself since the generator 17 is not intended for supplying the load in the network by itself.

Various operating conditions for the system will now be considered. Assume first that wind velocity is so low that propeller 10 would operate at such low speed that generator 17 would not be operating at synchronous speed which is a speed that would produce system frequency such as 60 Hz. Under this condition, the centrifugal mechanism of centrifugal switch means 13 would not have sufficient speed to bring about closure of switch contacts 14 in which case generator 17 would be isolated from the electric power network. Centrifugal clutch 24 would, under this condition also not have sufficient speed to bring about engagement of propeller shaft 11 with the first speed changer shaft 21 in which case the propeller would simply spin freely and at low speed.

Now assume that wind velocity and, hence, propeller 10 rotational speed begins to increase. When the propeller speed increases to a predetermined speed near which it could drive the generator through the speed changer at a speed that would result in the generator output voltage synchronizing with the power system or network voltage, centrifugal switch contacts 14 close. By way of example, and not limitation, in one actual embodiment the centrifugal switch contacts 14 are closed at about 85% of generator synchronous speed. Closure of contacts 14 connects the generator, by way of lines 15 and 16 to the system network and the generator then functions as a motor and approaches synchronous speed. Concurrently, the gear train in the speed changer and its first and second shafts 21 and 19, respectively are brought up to a speed corresponding with generator synchronous speed. Thus, the inertia of the speed changer is negated before centrifugal clutch 24 is operated to couple the propeller shaft to the input or first shaft 21 of the speed changer. Centrifugal clutch 24, however, is engaged within a relatively short time after centrifugal switch contacts 14 are closed. The clutch engages when the generator 17, acting as a motor, approaches up to synchronous speed which occurs on the order of a couple of seconds after the generator is connected to the network. Now, as long as wind velocity and propeller rotational rate stay above a synchronous speed the propeller will drive the generator 17 so it will supply electric power through the circuit comprised of lines 15 and 16 and switch contacts 14 to the network.

One unobvious advantage of the arrangement just described is that it permits use of a smaller propeller than would otherwise be required if the clutch coupled the propeller to the generator exclusively in response to the propeller reaching a certain speed corresponding the approximately the synchronous speed of the generator. A larger propeller would be required because greater excess torque would be needed to assure overcoming the significant inertia of the speed changer and generator rotor since these components would be at a standstill when the clutch is engaged.

Synchronous speed is, of course, dependent upon the number of poles for any given rotor speed. In one embodiment of the invention, a 4-pole generator is used where an output frequency of 60 Hz is desired which requires that the generator rotor turn at 1800 rpm at synchronous speed. By way of example, the ratio between the input and output shafts 21 and 19 of the speed changer is 20:1. Thus, in this example, synchronous speed is obtained when the propeller is turning at about 90 rpm. By driving the generator at slightly higher than synchronous speed of 1800 rpm it generates power.

When wind velocity remains high enough, the centrifugal switch contacts 14 remain closed and generator 17, acting as a generator, continues to supply electric power to the network. If, in the example given, the wind velocity drops such that the propeller turns at less than 90 rpm, the generator rotational speed will also begin to drop in which case the generator will start to draw power from the network and run in the motor mode at synchronous speed. Upon this event, the centrifugal clutch will respond by disengaging the speed changer input shaft 21 from the propeller shaft 11. This result is obtained by using an over-running type of clutch. As is well known, over-running clutches are characterized by maintaining the clutch in engagement when it is run in one direction and by automatically disengaging when it is run in the opposite direction. Thus, in the described system, when the propeller gets up to speed the centrifugally operated clutch engages so the propeller can drive the generator through the speed changer. When wind velocity drops, as just described, and the generator switches to the motor mode as it overtakes the propeller shaft speed, disengagement takes place. Any of several types of over-running clutches could be used. One type 24 is shown in FIG. 2 contained in box 12 as it is in FIG. 1.

FIG. 2 shows a fragment of the shaft 23 which is coupled to the input shaft 21 of the speed changer 20. The propeller shaft is marked 11 again and is concentric with clutch shaft 23. Shaft 23 is secured with a key 35 to the hub of a disc 36 to which a ring or drum 37 is secured by means of machine screws 38. There is a bearing 39 on the reduced diameter end of the propeller shaft 11 for the drum to rotate on. As can be seen particularly well in FIG. 3, a sleeve 40 is secured to propeller shaft 11 with a key 41. The sleeve has two integral and radially opposite extending arms 42 and 43. There are a pair of axially extending pins 44 and 45 fastened in the arms at diametrically opposite locations. A congruent pair of curved, unbalanced centrifugal levers, such as those marked 46 and 47, pivot on the pin 44 as shown in FIG. 3 and there is another pair, one of which is marked 48, that pivot on pin 45. The curved lever pairs are interconnected with a link 49 so the levers will pivot in unison.

Central sleeve 40, as can be seen in FIG. 3, has a radial extension 50. A headed adjustable screw 51 is threaded into extension 50. A compression spring 52 is interposed between screw 51 and a reaction element 53 which is mounted to a pivot pin 54. Each of the pairs of curved levers have slots in their peripheries and these are occupied by cross pin 55, which has a roller 56 on it and pin 57 which has a roller 58 on it. Alternatively, the rollers can be one piece with the pin ends 57 machined from the larger diameter stock. Pins 55 and 57 are allowed a little freedom for radial movement in their slots so their rollers can be driven in high frictional engagement with the internal surface of drum 37 while the pins bottom out in their slots and propeller shaft 11 is rotating at least as fast as the drum which, in effect, drives the generator rotor shaft. On the other hand, when the rotational speed of the drum is greater than that of the propeller shaft, the rollers can yield a little bit and make little if any frictional contact with the interior of drum 37.

It will be evident from inspection of FIG. 3 that when propeller shaft 11 is at a standstill or turning below a predetermined speed at which it should be coupled to the generator, the force of spring 52 will act on the curved levers to keep the rollers 56 and 58 substantially clear of the inside surface of drum 37. In such case the propeller shaft 11 cannot drive the drum nor can the drum drive the propeller shaft. When propeller shaft speed increases to a certain point, centrifugal force causes the free ends of the curved levers to swing outwardly about their pivots 44 and 45 such as to overcome the compressive force of spring 52. Assuming clockwise rotation of propeller shaft 11, the curved levers will force rollers 56 and 58 into wedging contact with the internal surface of drum 37, thereby driving the drum in the same direction as the propeller shaft. Thus, the propeller will begin to drive the generator rotor which, in accordance with the invention, would be up to synchronous speed already by reason of centrifugal switch contacts 14 having closed at a slightly lower propeller shaft speed. As long as countertorque is exerted through drum 37 by virtue of the generator load, and as long as the propeller shaft is being driven by the wind above critical speed, the clutch rollers will remain in engagement for driving the generator.

Assume now that the wind velocity dies down so the clutch must disengage. At this time, the generator will become a motor momentarily and, since the drum 37 is rotating in the same direction as propeller shaft whose speed is dropping, the generator and the drum will over-run the wedged in rollers 56 and 58, thereby negating the wedging action and disengaging the clutch. Of course, an instance later, centrifugal switch 13 will open its contacts 14 so the generator 17 will be disconnected from the electrical system or network until a high enough wind occurs again for the generator to supply power to the network.

The centrifugal switch 13 is also a commercially available type and the manner in which it is mounted in box 12 is illustrated in FIG. 2. Centrifugal switch assembly 13 comprises a housing 65 which contains its centrifugal force accuated components, not shown, and the switch contact 14 which is symbolized in FIG. 1. The leads to the switch contacts 14 within centrifugal switch housing 65 come out of the box 12 through insulating bushing 66. The circuit leading to the generator and to the network is also reproduced in FIG. 2.

Although wind generators are most frequently used for generating alternating current and for being coupled to an ac distribution network that is energized from other ac generators, it should be understood that the broad idea of getting the speed changer up to speed by the method disclosed herein would also be applicable to dc systems as well. In a dc system, the centrifugal switch and clutch could be set so that when the wind velocity is high enough, the generator would have developed an output voltage that is equal to or slightly above the dc network voltage. Thus, in a dc system one would not have to be concerned about getting the generator in phase with the dc distribution system. To minimize size and weight of a dc generator, and to obtain the same output, the gear box and clutch system of the invention would be desirable.

Although in the disclosed construction a wind propeller driven shaft is the input to the system, other sources of input power can be employed such as a water wheel, steam turbine or solar operated engine or the like.

In view of the invention, propeller designs efficient at high speeds can be employed without comprising these efficient designs to obtain the high starting torque as required by prior art wind generators employing speed changers.

I claim:

1. A wind power system comprising:
generator means operative alternately in a generator mode or a motor mode and having a rotor shaft,
switch control means and a circuit including a switch controlled by said control means to selectively connect and disconnect said generator means to and from, respectfully, an electric power system,
a wind driven propeller and a propeller shaft supporting said propeller for rotation,
speed changer means having first and second shafts, the ratio of said means being such that the second shaft revolves several times for every one revolution of the first shaft, said second shaft being coupled to said rotor shaft,
said switch control means responding to said propeller being rotated by the wind at below a first predetermined speed by maintaining said switch open and responding to said propeller being rotated up to said first predetermined speed by closing said switch to thereby connect said generator means to said electric power system for drawing power from said system to operate said generator means in said motor mode for driving said speed changing means up to a speed corresponding to motor speed,
over-running clutch means responsive to said propeller shaft reaching a speed higher than said predetermined speed by coupling said propeller shaft to said first shaft of the speed changer means while said generator means is operating in said motor mode so that said generator converts to operating in said generator mode to deliver power to said electric power system,
slowing of said propeller shaft speed below said higher speed due to a drop in wind velocity causing said generator to convert to operating in the motor mode and said clutch responding to said rotor shaft turning at a higher speed than said shaft is being driven with the slowing propeller by uncoupling said propeller shaft from the first shaft of said speed changer means.

2. The system according to claim 1 wherein:
said clutch means is operative to couple said propeller shaft to said first shaft of said speed changer means in response to said propeller shaft attaining a speed slightly higher than the speed at which said switch control means operates said switch to connect said generator to said power system for causing the generator to run in said motor mode.

3. The system according to claim 1 wherein said clutch means includes:

hub means coupled to said rotor shaft for rotation therewith and having an annular interior surface arranged coaxial with said shaft centrifugal members within said annular surface mounted to said propeller shaft for swinging about axes, respectively, that are parallel to and radially outwardly displaced from the axis of said rotor shaft, roller means mounted to said centrifugal members for rotation about axes parallel to and displaced from the axes about which said members swing, said centrifugal members swinging in response to centrifugal force resulting from said propeller shaft exceeding said predetermined speed to thereby engage said annular surface for driving said hub means and rotor shaft to cause said generator to deliver electric power to said system, lowering of said propeller shaft speed due to a reduction in wing velocity resulting in said generator means converting to said motor mode to cause said hub to overrun said roller means and disengage said roller means from said annular surface.

4. The system according to claim 1 wherein said electric power system is an alternating current system and said generator means is an alternating current device and said control device is operative to close said switch to connect said generator means to said system for running in the motor mode when said propeller shaft speed increases to a speed corresponding to about 85% of the synchronous speed of said generator means.

5. An electrical generating system comprising:

generator means operative alternately in a power generating mode at a predetermined high speed and a motor mode at a predetermined lower speed and having a rotor shaft, switch control means and a circuit including a switch controlled by said control means to selectively connect and disconnect said generator means to and from an electric power system, speed changer means having first and second shafts said second shaft being coupled to said generator rotor shaft and said first shaft coupled to a drive assembly output shaft, a drive assembly including an input and an output shaft and clutch means engagable at said predetermined high speed, said output shaft being coupled to said speed changer first shaft when said clutch is engaged at said predetermined high speed, said switch control means responding to said input shaft attaining said predetermined low speed by closing said switch to thereby connect said generator means to said electric power system for drawing power from said system to operate said generator means in said motor mode for driving said speed changing means up to a speed corresponding to said predetermined high speed prior to engagement of said clutch means and said generator means converting to said power generating mode when said generator means attains said predetermined high speed and said clutch means is engaged with input power from said drive assembly.

* * * * *